(12) United States Patent
Muller et al.

(10) Patent No.: US 6,691,737 B2
(45) Date of Patent: Feb. 17, 2004

(54) HAND DRIVE FOR SHUT-OFF MEMBERS

(75) Inventors: Fritz Muller, Ingelfingen (DE); Gregor Gaida, Niederhall (DE)

(73) Assignee: Gemü Gebrüder Müller Apparatebau GmbH & Co. KG, Ingelfingen (DE)

( * ) Notice: Subject to any disclaimer, the term of this patent is extended or adjusted under 35 U.S.C. 154(b) by 0 days.

(21) Appl. No.: 10/216,952

(22) Filed: Aug. 12, 2002

(65) Prior Publication Data

US 2002/0195148 A1 Dec. 26, 2002

Related U.S. Application Data

(63) Continuation of application No. PCT/EP01/01430, filed on Feb. 9, 2001.

(30) Foreign Application Priority Data

Feb. 12, 2000 (DE) .......................... 100 06 326

(51) Int. Cl.[7] .............................................. F16K 37/00
(52) U.S. Cl. .................. 137/556; 137/559; 251/267; 251/285
(58) Field of Search ............................. 137/556, 559; 251/266, 267, 285, 331

(56) References Cited

U.S. PATENT DOCUMENTS

| | | | | |
|---|---|---|---|---|
| 2,091,618 A | * | 8/1937 | Szabo | 137/556 |
| 2,381,544 A | * | 8/1945 | Jacobsen | 251/267 |
| 2,540,371 A | * | 2/1951 | Jacobsen | 251/267 |
| 2,977,981 A | * | 4/1961 | Jarrett | 251/331 |
| 3,134,570 A | * | 5/1964 | Jarrett | 251/331 |
| 4,014,514 A | * | 3/1977 | Priese et al. | 251/331 |
| 4,505,451 A | * | 3/1985 | Jonas | 251/285 |
| 5,609,185 A | * | 3/1997 | Booth et al. | 137/556 |
| 5,647,397 A | | 7/1997 | Heiniger et al. | |
| 5,823,509 A | * | 10/1998 | Daniels | 251/285 |

FOREIGN PATENT DOCUMENTS

| | | |
|---|---|---|
| GB | 1 064 868 A | 4/1967 |
| GB | 1 513 503 A | 6/1978 |

* cited by examiner

*Primary Examiner*—A. Michael Chambers
(74) *Attorney, Agent, or Firm*—Henry M. Feiereisen

(57) ABSTRACT

A hand drive for shut-off members is described, for example for membrane valves, the hand drive comprises a hand wheel for actuating the valve which is provided with a closure limiter and a valve lift limiter, the hand wheel is provided with two inserts mounted thereon for axial adjustability; and wherein the inserts interact with a threaded spindle coupled with a valve element so as to adjust the valve lift limiter and the closure limiter.

7 Claims, 2 Drawing Sheets

HAND DRIVE FOR SHUT-OFF MEMBERS

CROSS-REFERENCES TO RELATED APPLICATIONS

This application is a continuation of prior filed copending PCT International application No. PCT/EP01/01430, filed Feb. 9, 2001.

This application claims the priority of German Patent Application Serial No. 100 06 326.8, filed Feb. 12, 2000, the subject matter of which is incorporated herein by reference.

BACKGROUND OF THE INVENTION

1. Field of the Invention

The invention relates to a hand drive for opening and closing a shut-off member, and in particular to a membrane valve with a hand wheel and a threaded spindle coupled to a valve element which can be moved by the hand wheel in an axial direction.

Various valve designs are known in the art that limit movement of the valve stem. For example, CA 106 26 88 discloses a radiator valve with a housing carrying a valve stem with plate and loading spring on the valve stem above the valve plate. The valve seal can be removed without removing the valve tensioning spring. U.S. Pat. No. 5,647,397 discloses a valve which allows adjusting a minimum flow cross section via an adjustable limit stop. A coupling rod passes through the cover of the valve housing and serves as an indicator for the valve position. However, there is a need for a valve wherein the closure position of the valve element and preferably also the valve lift are limited, preferably with an element that is integrated with the valve.

SUMMARY OF THE INVENTION

It is thus an object of the present invention to provide an improved hand drive for shut-off members, obviating the afore-stated drawbacks.

According to one aspect of the invention, a hand drive for opening and closing a shut-off member, in particular a membrane valve, includes a valve element, a hand wheel and a threaded spindle coupled to the valve element, with the spindle axially moveable by the hand wheel, and a first limiter device for limiting the closure position of at least one of the threaded spindle and the valve element disposed on the hand wheel. For also limiting the valve lift of the valve element and/or the valve spindle, a second limiter device is arranged on the hand wheel.

Advantageously, the hand wheel is provided with an inside thread in which an insert provided with a radial collar is threaded so as to be adjustable in an axial direction, whereby the threaded spindle is also provided with a radial collar. The collar of the insert can axially contact the collar on the threaded spindle for limiting the closure position of the valve element.

Preferably, the insert is provided with an interior thread into which another axial displaceable insert with a radial collar is screwed. The collar of the other insert can axially contact the collar on the threaded spindle for limiting the valve lift of the valve element.

According to another embodiment of the invention, the hand wheel is provided with a covering cap for the inserts, wherein this covering cap is connected via respective n-sided flat (for example, a 12-sided flat) with each of the hand wheel and the two inserts, so as to prevent an unintentional rotation of the two inserts relative to each other or relative to the hand wheel.

Advantageously, the hand wheel is non-rotatably coupled with yet another insert, which is secured in a valve a housing and connected with the threaded spindle via a thread, wherein the hand wheel is fixed in the axial direction between the valve housing and the insert.

Advantageously, a visual indicator is fixedly attached to the threaded spindle, whereby the collar of the threaded spindle can be formed on the visual indicator.

Advantageously, the device that limits the closure position of the threaded spindle can be arranged inside the second device that limits the valve lift of the threaded spindle.

Further features and advantages of the present invention will be apparent from the following description of preferred embodiments and from the claims.

BRIEF DESCRIPTION OF THE DRAWING

The following figures depict certain illustrative embodiments of the invention in which like reference numerals refer to like elements. These depicted embodiments are to be understood as illustrative of the invention and not as limiting in any way.

DETAILED DESCRIPTION OF PREFERRED EMBODIMENTS

The invention is directed to hand drive for opening and closing a shut-off member, in particular a membrane valve.

Figure 1:
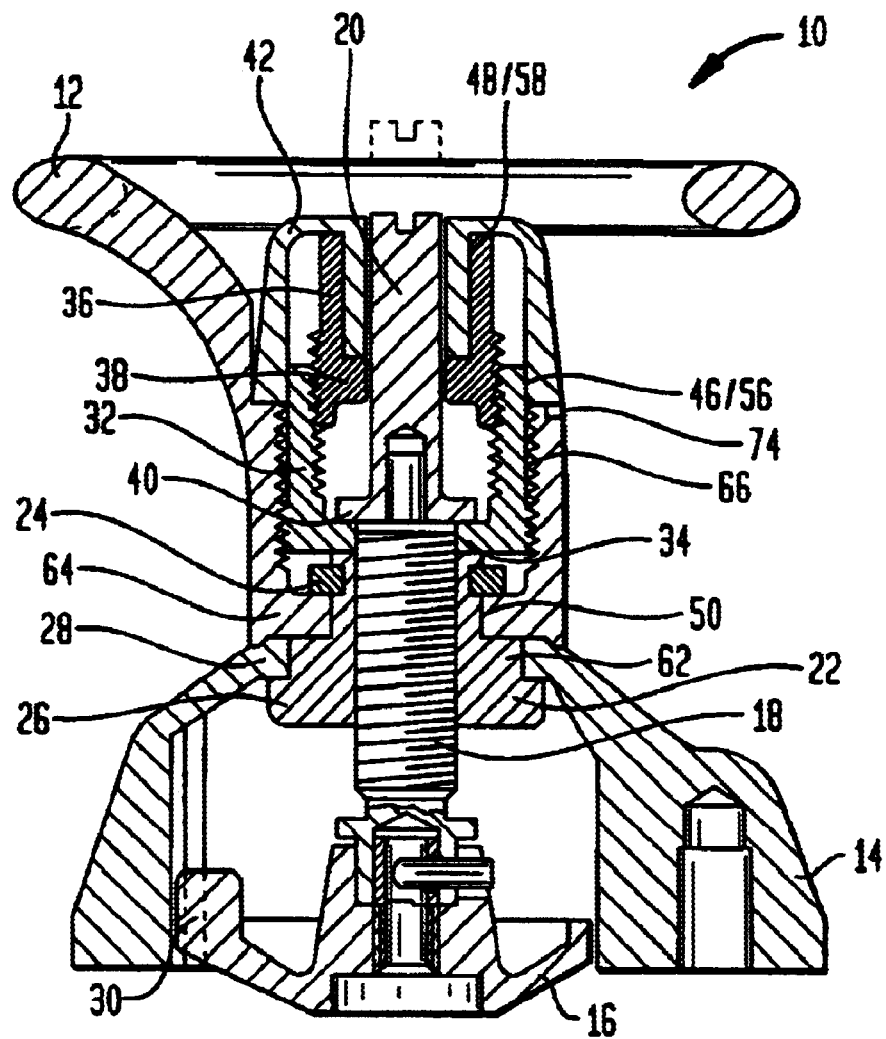
FIG. 1 shows schematically a cross-sectional view of a preferred embodiment of the hand drive of the invention.
Figure 2:
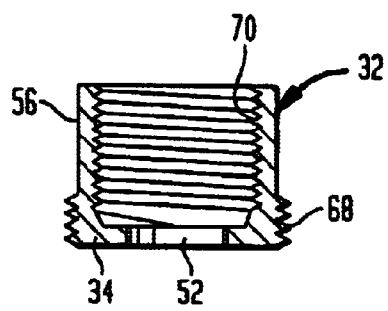
FIG. 2 shows a cross-sectional view of an insert for limiting the closure position of the valve element.
Figure 3:
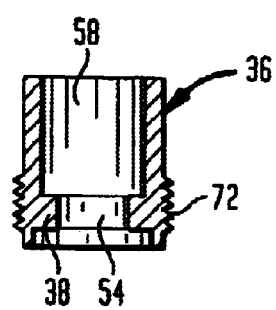
FIG. 3 shows a cross-sectional view of an insert for limiting the valve lift of the valve element.
Figure 4:
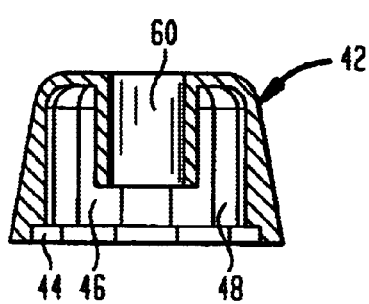
FIG. 4 shows a cross-sectional view of a covering cap for securing the insert of FIGS. 2 and 3 against unintentional rotation.
Figure 5:
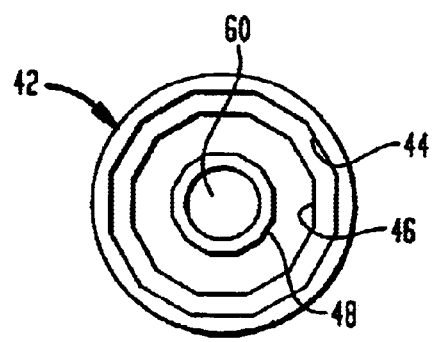
FIG. 5 shows a top view of the covering cap of FIG. 4.

Referring now to FIG. 1, a hand drive 10 for operating shut-off members, such as a valves, includes a hand wheel 12 which is secured and held in a fixed axial position on a valve housing 14 (only partially shown), as will be described below. A valve element 16 is arranged in the valve housing 14 for opening and closing a valve seat (not shown). The valve element 16 is suitably connected with a threaded spindle 18 which can be moved axially with a hand wheel 12 via an insert 22 in either of two directions.

The hand wheel 12 is non-rotatably connected with the insert 22, for example with an n-sided flat 50 which can be constructed, for example, in form of a 12-edged flat. The insert 22 has an interior thread which engages with an exterior thread of the threaded spindle 18. The hand wheel 12 is axially held between a collar 62 of the insert 22 and a support ring 24 disposed in an annular groove of the insert 22.

This threaded insert 22 also has a flange 26 which makes contact with the inside of a flange 28 of the valve housing 14, whereas the end 64 of the hand wheel 12 makes contact with the outside of the flange 28 of the valve housing 14.

In this way, the hand wheel 12 is axially fixed on the valve housing 14, so that it can only perform a rotational movement, but not an axial movement.

The valve element engages with a nose 30 in an axial groove (not indicated by a reference numeral) in the valve housing and is thereby secured against rotation.

The hand wheel 12 is provided with an interior thread 66, in which an insert 32 which has an exterior thread 68 is screwed, while still allowing axial adjustment.

This insert 32 has a radial, inwardly pointing collar 34, which is bounded by a central bore 52, whose diameter is slightly larger than the outside diameter of the threaded spindle 18.

The insert 32 is also provided with an interior thread 70, in which an axially displaceable insert 36 having an outside thread 72 is screwed. The insert 36 has a radially inwardly oriented collar 38 which is bounded by a central bore 54.

The insert 32 is axially adjustable in the interior thread 66 of the hand wheel 12, whereas the insert 36 is axially adjustable in the interior thread 70 of the insert 32.

A visual indicator 20 is axially screwed on and affixed to the threaded spindle 18. The visual indicator 20 extends through the hand wheel 12 to the outside and is provided to indicate the position of the valve element 16.

The end of the visual indicator 20 that abuts the threaded spindle 18 is provided with a radially outwardly oriented collar 40. The collar 40 which also can be formed directly on the threaded spindle 18, cooperates, as will be described below, with the collar 34 of the insert 32 to limit the closing movement, and with the collar 38 of the insert 36 to limit the valve lift.

As indicated in FIG. 1, the hand wheel 12 is provided with a covering cap 42 which is placed on the hand wheel 12 and covers the inserts 32 and 36 to the outside.

The covering cap 42 is non-rotatably connected with the hand wheel 12 and with each of the two inserts 32 and 36 to at least partially prevent unintentional rotation of the two inserts 32, 36 relative to each other and relative to the hand wheel 12.

To connect the covering cap plate 42 with the hand wheel 12, the covering cap plate 42 is provided with an in interior n-sided flat 44, for example an interior 12-edged flat, which is placed in clamping engagement on a corresponding exterior n-sided flat 74 of the hand wheel 12.

The covering cap 42 also has an interior n-sided flat 46, for example an interior 12-edged flat, which engages with a corresponding exterior n-sided flat 56 of the insert 32.

Lastly, the covering cap 42 is provided with an exterior n-sided flat 48 which engages with a corresponding interior n-sided flat 58 of the insert 36.

When the covering cap 42 is in place, the inserts 32 and 36 are secured against unintentional rotation relative to each other and relative to the hand wheel 12.

The covering cap 42 also has a central bore 60 through which the visual indicator 20 extends.

The closure limit and the valve lift limit for the valve element 16 are adjusted as follows.

When the covering cap 42 is removed, the required minimal opening for a desired minimal flow of the shut-off member is set by turning the hand wheel 12. Thereafter, the axially adjustable insert 32 is adjusted upwardly (direction with reference to FIG. 1), until its collar 34 contacts the collar 40 of the visual indicator 20. The outside diameter of the collar 40 is somewhat greater than the inside diameter of the collar 34.

The closure limit of the valve and/or the desired minimal flow is thereby set.

For setting the maximum flow, the hand wheel 12 is turned until the desired maximum flow is reached. Thereafter, the insert 36 which is axially displaceable in the insert 32, is pulled downwardly (direction with reference to FIG. 1), until its collar 38 contacts the collar 40 of the visual indicator 20. The outside diameter of the collar 40 is somewhat greater than the inside diameter of the collar 38.

When the collar 40 contacts the collar 38 of the insert 36, the maximal valve lift and thereby also the desired limit stop of the threaded spindle 18 and/or the valve element 16 are adjusted.

After these adjustments have been made, the covering cap 42 is put back in place, whereby the positions of the inserts 32 and 36 relative to each other and to the hand wheel 12 are fixed, i.e., secured against unintentional rotation.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed as new and desired to be protected by Letters Patent is set forth in the appended claims:

What is claimed is:

1. Hand drive for opening and closing a shut-off member, in particular a membrane valve, comprising:
    a valve element,
    a hand wheel and a threaded spindle coupled to the valve element, with the spindle axially moveable by the hand wheel,
    a first limiter device for limiting the closure position of at least one of the threaded spindle and the valve element disposed on the hand wheel, and
    a second limiter device for limiting the valve lift of at least one of the threaded spindle and the valve element disposed on the hand wheel.

2. Hand drive according to claim 1, wherein the second limiter device for limiting the valve lift of the threaded spindle is disposed inside the first limiter device for limiting the closure position of the threaded spindle.

3. Hand drive for opening and closing a shut-off member, in particular a membrane valve, comprising:
    a valve element,
    a hand wheel and a threaded spindle coupled to the valve element, with the spindle axially moveable by the hand wheel,
    a first limiter device for limiting the closure position of at least one of the threaded spindle and the valve element disposed on the hand wheel, and
    a first axially displaceable insert having a radial collar, said first insert being screwed into an interior thread of the hand wheel, wherein the threaded spindle is provided with a radial collar adapted to contact the radial collar of the first insert in the axial direction so as to limit the closure position of the valve element.

4. Hand drive according to claim 3, and further including a second axially displaceable insert having a radial collar, wherein the first axially displaceable insert has an interior thread, into which the second axially displaceable insert is screwed, with the radial collar of the threaded spindle adapted to contact the radial collar of the second insert in the axial direction so as to limit the valve lift of the valve element.

5. Hand drive according to claim 4, wherein the hand wheel includes a covering cap that cover the first and second axially displaceable inserts, and wherein the covering cap is connected by an n-sided flat essentially non-rotatably with the hand wheel as well as with the first and second axially displaceable inserts which also have corresponding n-sided flats.

6. Hand drive according to claim 3, and further comprising a visual indicator fixedly connected with the threaded spindle, with the collar of the threaded spindle being formed on the visual indicator.

7. Hand drive for opening and closing a shut-off member, in particular a membrane valve, comprising:
- a valve element,
- a hand wheel and a threaded spindle coupled to the valve element, with the spindle axially moveable by the hand wheel,
- a first limiter device for limiting the closure position of at least one of the threaded spindle and the valve element disposed on the hand wheel, and
- an insert secured in a valve housing and non-rotatably connected with the hand wheel, wherein the insert is coupled via a thread with the threaded spindle, and the hand wheel is axially fixed between the valve housing and the third insert.

\* \* \* \* \*